Patented Apr. 4, 1950

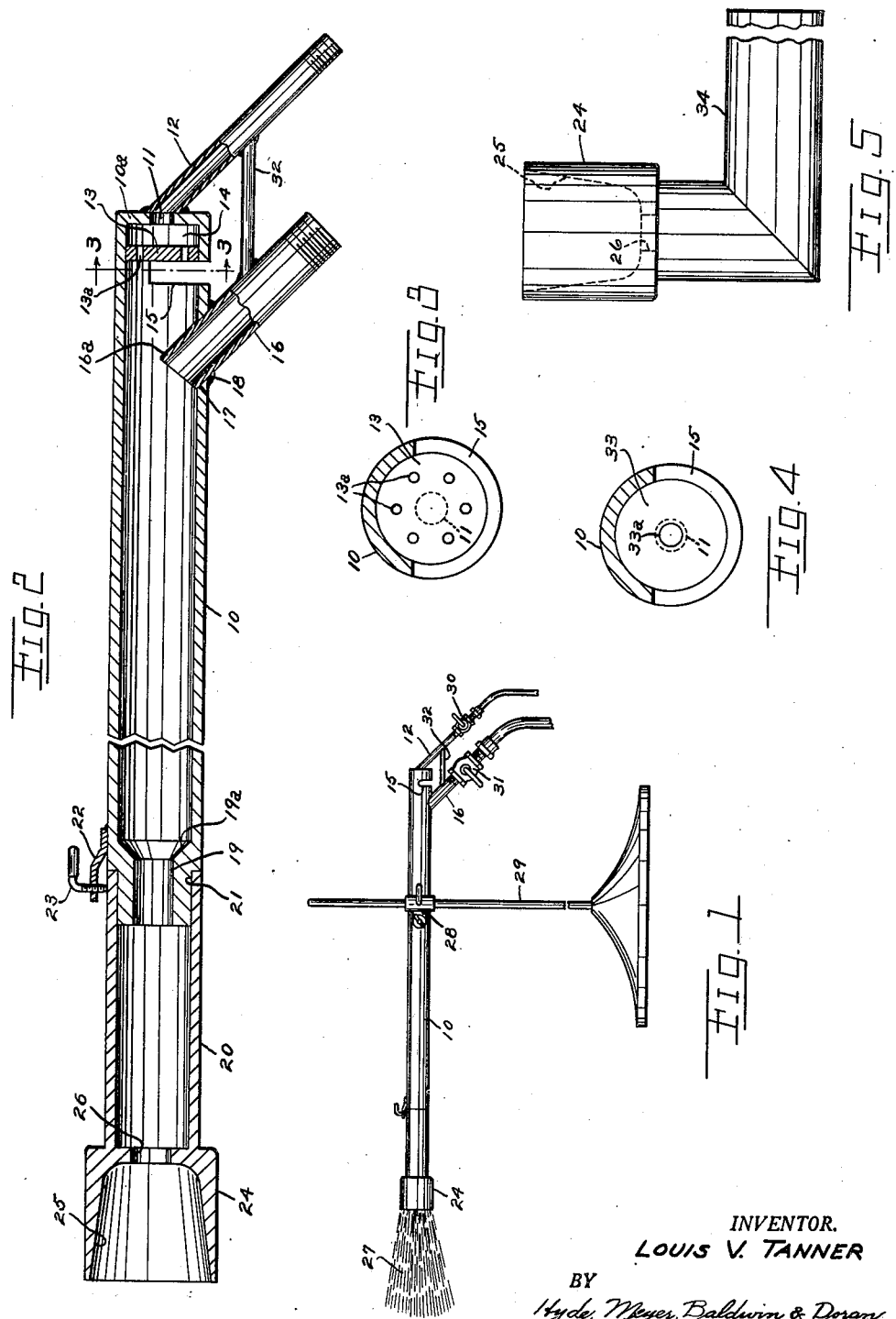

2,502,604

UNITED STATES PATENT OFFICE 2,502,604

HEATING TORCH

Louis V. Tanner, Cleveland, Ohio

Application April 27, 1949, Serial No. 89,967

9 Claims. (Cl. 158—27.4)

This invention relates to improvements in a heating torch of the type used to heat up castings before welding.

One of the objects of the present invention is to provide efficient means for mixing the air and gas before the same begins to burn at the mouth of the torch.

Another object of the present invention is to provide novel means for introducing air under pressure in the torch in such a way that it aspirates large volumes of free air into the burner for mixture with the fuel gas.

Still another object of the invention is to introduce the gas line into the torch in such a manner that gas will be drawn into the torch even though the gas pressure is low.

Another object of the present invention is to provide novel throat portions where the gas and air will be thoroughly mixed before burning.

Other objects and advantages of my invention will be apparent from the accompanying drawings and description and the essential features will be set forth in the appended claims.

In the drawings,

Fig. 1 is a side elevational view of one embodiment of my improved heating torch mounted on a supporting stand;

Fig. 2 is a central sectional view taken longitudinally through the torch of Fig. 1 with the parts enlarged;

Fig. 3 is a transverve sectional view enlarged taken along the line 3—3 of Fig. 2;

Fig. 4 is a view similiar to Fig. 3 showing a modified form of compressed air orifice plate; while Fig. 5 is a side elevational view of another form of nozzle adapted for use with the torch of Fig. 2.

I have provided a simple but very efficient torch, the main body of which 10 may be constructed of a piece of pipe. The rear end of this pipe is closed by a wall 10a. Through this wall, there is an opening 11 communicating with an air line 12. In the present instance, I have welded a short length of metal pipe for the air line and other pipe or hose may be connected at the free end of the pipe 12. A short distance inwardly from the rear wall 10a I provide a partition wall 13 through which I provide a plurality of evenly spaced orifices 13a in the form shown in Figs. 2 and 3. As illustrated, there are six of these orifices located on a circle and at a diameter which is greater than the diameter of the opening 11. I thus provide a distribution chamber 14 between the opening 11 and the orifices 13a and the compressed air entering through the pipe 12 cannot flow directly from the opening 11 through the orifices but instead is evenly distributed and then passes in equalized manner outwardly through the plurality of orifices. Just in front of the partition 13, I provide a slotted opening 15 through the bottom and side walls of the pipe 10. Preferably, this opening is of a length between one-half and three-quarters of the outer circumference of the pipe as is clearly shown in Fig. 3. It results from this construction that the compressed air entering at high velocity through the orifices 13a and traveling substantially parallel to the axis of the pipe 10 aspirates large volumes of free air through the slotted opening 15. Thus I get sufficient air for my purposes by means of a very small volume of compressed air entering through the pipe 12.

For introducing gaseous fuel into the torch, I cause a gas line 16 to protrude through an opening 17 in the bottom wall of the pipe 10 and weld the same to the wall at the zone 18. It will be noticed in Fig. 2 that the axis of the pipe 16 is inclined forwardly and upwardly relative to the axis of the pipe 10. It will be noted also that I permit the rear wall of the pipe 16 within the pipe 10 to extend upwardly as indicated at 16a in Fig. 2 to a point close to the mid portion of the pipe 10. In this manner, the air streaming through the pipe 10 past the wall 16a of the pipe 16 causes a slight suction at the outlet of the pipe 16 so that sufficient gas is aspirated into the torch even if the gas pressure is somewhat low.

The high speed jets of air issuing through the orifices 13a and traveling past the end of the pipe 16 immediately begin to mix the gas in good fashion. However, I increase this mixing by providing a mixing throat 19 downstream from this point. This throat may be provided by upsetting the metal at the end of the pipe 10 or by welding parts in place or by the provision of a casting. The diameter of the throat 19 is preferably half or a little more than half of the diameter of the pipe 10. The walls 19a leading into the throat 19 are beveled so as to give a smooth flow of the gaseous and air mixture. This beveled throat also throws the gas and air into great turbulence in the throat 19 so as to cause a better mixture.

Downstream from the throat 19 I provide a nozzle 20. Preferably, the main body of this nozzle is a pipe of the same diameter as the pipe 10 and this is set into a shoulder 21 which is formed in the thickened throat portion at the end of the pipe 10. To hold the nozzle in place, I provide a bracket 22 welded on the pipe 10 through which is threaded a set screw or clamp 23. The mouth end of the nozzle comprises a portion 24 of greater diameter having a hollow flared mouth 25. A throat 26 leads from the main body of the nozzle 20 into the flared mouth portion 25. Preferably, this throat portion 26 is of approximately the same diameter as the throat portion 19. Here again, there is a mixing chamber inside of the pipe portion 20 of the nozzle and a thorough mixing again at the throat 26 before the mixture of gas and air expands in the mouth portion 25.

When the torch is lit the flame burns at 27 outside of the mouth portion 25 of the nozzle with a very hot flame. The velocity of the issuing stream is sufficient to prevent a flash back of the flame into the interior pipe portions 20 and 10.

Means may be provided as shown in Fig. 1 for supporting the torch to play upon a casting or the like. To this end, a bracket 28 is secured to the body of the torch and this in turn is clamped to a pedestal 29. In this view the air line is shown equipped with a control valve 30 and the gas line equipped with a control valve 31. A brace 32 is welded between the pipes 12 and 16 so as to hold them firmly in position and to overcome the weakness in the pipe 10 caused by the slotted opening 15.

In Fig. 4, I have shown a modified arrangement to replace the partition 13 and the orifices 13a. In Fig. 4, the partition is indicated at 33 and this is provided with a single central orifice 33a. The air stream entering through the orifice 33a will aspirate large quantities of free air through the slotted opening 15 as in the first described form. However, the construction of Fig. 4 does not give as good a mixture of the air and gas as the construction of Fig. 3.

A modified form of nozzle is shown in Fig. 5. Sometimes it is necessary to apply the flame at an angle to the general direction of the torch body 10. I have therefore provided a nozzle having a main body portion 34 which has a bend in it of the required angularity. Obviously, this could be any angle desired, a ninety degree angle being shown. The enlarged portion 24, mouth 25 and throat 26 are arranged the same as in Fig. 2.

Without limiting my invention to any specific arrangement of parts as to size, I will give the sizes of one embodiment in order to illustrate the proportioning of the parts. In this embodiment the pipe 10 is one and one-half inches outside diameter, the opening at 11 is three-eighths inch supplied through a quarter inch air line, the orifices 13a are one-eighth inch diameter, the slotted opening 15 measures about three-eighths inches longitudinally of the pipe 10, the gas line 16 is a half inch, the throats 19 and 26 are seven-eighths inch diameter, and the nozzle portion 24 is about two and one-quarter inches outside diameter. In this same embodiment, the pipe 10 is about twenty-four inches long and the nozzle is about seven inches long.

I have thus provided a torch which is cheap to construct but which is very efficient in the mixing of the gaseous fuel with the air and which is very economical in the use of compressed air.

What I claim is:

1. In a heating torch, a tubular housing having an open mouth at one end and an end wall at the other end, there being an opening through said end wall for admission of compressed air, air supply means communicating with said air admission opening, a partition in said housing generally parallel to and spaced a short distance from said end wall, there being an opening through said partition for the admission of an air jet, there being an opening through the side wall of said tubular housing in front of said partition communicating with atmosphere for the aspiration of air into said housing by said jet, and inlet means for gaseous fuel in front of said last named opening.

2. The combination of claim 1 wherein said inlet means for gaseous fuel is provided with a shield on the side thereof toward said partition.

3. The combination of claim 1 wherein said inlet means for gaseous fuel comprises a pipe inclined upwardly and forwardly through a wall of said tubular housing.

4. In a heating torch, a tubular housing having an open mouth at one end and an end wall at the other end, there being an opening through said end wall for admission of compressed air, air supply means communicating with said air admission opening, a partition in said housing generally parallel to and spaced a short distance from said end wall, there being a plurality of openings through said partition offset with respect to said compressed air opening, said last named openings providing for admission of air jets, there being an opening through the side wall of said tubular housing in front of said partition communicating with atmosphere for the aspiration of air into said housing by said jet, and inlet means for gaseous fuel in front of said last named opening.

5. In a heating torch, a tubular housing having an open mouth at one end and an end wall at the other end, there being an opening through said end wall for admission of compressed air, air supply means communicating with said air admission opening, a partition in said housing generally parallel to and spaced a short distance from said end wall, there being an opening through said partition for the admission of an air jet, there being an opening through the side wall of said tubular housing in front of said partition communicating with atmosphere for the aspiration of air into said housing by said jet, said last named opening consisting of a slot extending around the bottom of said housing for at least 180 degrees of its periphery, and inlet means for gaseous fuel in front of said last named opening.

6. The combination of claim 1 including a throat near the open end of said housing of less diameter than the inside diameter of said housing.

7. The combination of claim 1 including two throats spaced longitudinally of said housing, said throats being less in diameter than the inside diameter of said housing.

8. The combination of claims 1 and 7 including a flared mouth on the discharge side of that one of said two throats farthest downstream.

9. In a heating torch, a cylindrical tubular housing having an open mouth at one end and an end wall at the other end, there being a single round central opening through said end wall for admission of compressed air, air supply means communicating with said air admission opening, a partition in said housing generally parallel to and spaced from said end wall, there being a plurality of openings through said partition arranged in a circle of greater diameter than said end wall opening, said last named openings providing for admission of air jets, there being a slotted opening through the side wall of said housing directly in front of said partition communicating with atmosphere for the aspiration of air into said housing by said jet, said slotted opening extending at least 180 degrees around the circumference of said housing, a gas inlet pipe extending upwardly and forwardly through the bottom wall of said housing in front of said slotted opening, and there being two throats in said housing between said gas inlet pipe and said open mouth, said throats having inside diameters less than the inside diameter of said housing.

LOUIS V. TANNER.

REFERENCES CITED

The following references are of record in the file of this patent:

UNITED STATES PATENTS

| Number | Name | Date |
|---|---|---|
| 901,338 | Grabau | Oct. 20, 1908 |
| 912,500 | Snyder | Feb. 15, 1909 |
| 1,264,983 | Seilkop | May 7, 1918 |
| 1,384,954 | Hoke | July 19, 1921 |